United States Patent
Pfeifer et al.

(10) Patent No.: US 10,435,049 B2
(45) Date of Patent: Oct. 8, 2019

(54) METHOD FOR TRANSMITTING DATA

(71) Applicant: INNOVA PATENT GMBH, Wolfurt (AT)

(72) Inventors: Daniel Pfeifer, St. Anton am Arlberg (AT); Bernard Perrin, Colombier (CH); Gerhard Netzer, Wolfurt (AT); Jean-Dominique Decotignie, Cheseaux (CH); Philippe Dallemagne, Cormondreche (CH)

(73) Assignee: Innova Patent GmbH, Wolfurt (AT)

( * ) Notice: Subject to any disclaimer, the term of this patent is extended or adjusted under 35 U.S.C. 154(b) by 20 days.

(21) Appl. No.: 15/777,415

(22) PCT Filed: Nov. 17, 2016

(86) PCT No.: PCT/EP2016/078072
§ 371 (c)(1),
(2) Date: May 18, 2018

(87) PCT Pub. No.: WO2017/085223
PCT Pub. Date: May 26, 2017

(65) Prior Publication Data
US 2018/0327007 A1     Nov. 15, 2018

(30) Foreign Application Priority Data
Nov. 19, 2015 (AT) .................. A 746/2015

(51) Int. Cl.
*B61L 15/00* (2006.01)
*H04L 12/40* (2006.01)
(Continued)

(52) U.S. Cl.
CPC .......... *B61L 15/0018* (2013.01); *B61B 12/00* (2013.01); *H04B 3/50* (2013.01);
(Continued)

(58) Field of Classification Search
CPC .................................................. B61L 15/0018
See application file for complete search history.

(56) References Cited

U.S. PATENT DOCUMENTS 6,400,281 B1   6/2002   Darby, Jr. et al.
6,469,999 B1   10/2002  Kim et al.
(Continued)

FOREIGN PATENT DOCUMENTS

DE      10122218 C1   11/2002
EP      0845918 A2    6/1998
(Continued)

*Primary Examiner* — John D Blanton
(74) *Attorney, Agent, or Firm* — Laurence A. Greenberg; Werner H. Stemer; Ralph E. Locher

(57) ABSTRACT

Data are transmitted from a secondary station to a master station along a segmented path, wherein two contiguous segments are respectively connected by a node and wherein the path has at least three segments with at least two nodes. The data from the secondary station are split into N data packets, where N is the number of nodes. The data packets are marked distinguishably, each marking corresponding to a particular node on the path. Each data packet along the path is forwarded only to the adjacent node or adjacent station. Each node checks to determine whether the marking of the packet corresponds to the respective node. If so, data from the node are added to the data packet. The data packets are collected in the master station. The data transmission is concluded successfully if all N data packets with data from all N nodes are present.

10 Claims, 3 Drawing Sheets

(51) Int. Cl.
*H04W 40/22* (2009.01)
*B61B 12/00* (2006.01)
*H04B 3/50* (2006.01)
*H04L 12/26* (2006.01)

(52) U.S. Cl.
CPC .......... *H04L 12/40* (2013.01); *H04L 43/0817* (2013.01); *H04L 43/0829* (2013.01); *H04W 40/22* (2013.01)

(56) References Cited

U.S. PATENT DOCUMENTS

| | | |
|---|---|---|
| 8,203,995 B2 | 6/2012 | Chindapol et al. |
| 2010/0180094 A1 | 7/2010 | Min et al. |
| 2012/0244852 A1 | 9/2012 | Edge et al. |
| 2013/0031320 A1 | 1/2013 | Min |
| 2015/0382203 A1* | 12/2015 | Kitsunezuka ......... H04W 16/18 370/254 |
| 2016/0171786 A1* | 6/2016 | Otsuka .................. G06Q 50/30 705/13 |
| 2016/0295470 A1* | 10/2016 | Timms .............. H04W 36/0083 |

FOREIGN PATENT DOCUMENTS

| | | |
|---|---|---|
| RU | 2172078 C2 | 8/2001 |
| RU | 2477583 C2 | 3/2013 |
| WO | 9530216 A1 | 11/1995 |
| WO | 9842096 A2 | 9/1998 |
| WO | 2012060933 A1 | 5/2012 |

\* cited by examiner

METHOD FOR TRANSMITTING DATA

BACKGROUND OF THE INVENTION

Field of the Invention

The invention relates to methods for transmitting data from at least one secondary station to at least one primary station along a segmented path, wherein two abutting segments are respectively connected by a node and wherein the path has at least three segments having at least two nodes.

A cable car installation has not only the safety functions in the stations but also monitoring devices on the path. The path is that portion of the cable car installation that is between the stations and comprises support structures, vehicles, the cable and all mechanical and electrical safety equipment connected thereto. The signal and data transmission from the path to the station(s) or from station to station is a challenge of its own in this case.

This challenge is overcome in the prior art using two essential techniques that each entail disadvantages and costs of their own.

First, underground cables are laid from support to support that connect the individual supports among one another and the stations to one another. The advantage of this solution is that underground cables, once they are laid, require hardly any further maintenance and are very reliable, since they are protected against most environmental influences. The disadvantage of underground cables is that they require the ground along the cable car route to be opened up. This firstly involves substantial costs and secondly is not possible in many cases, since mountain landscapes are frequently under special landscape and environmental protection and extensive works, as are required for underground cables, are not approved.

Secondly, aerial cables in addition to the suspension and/or traction cables are stretched between the supports. This option also entails great costs, since in this way the supports have to be anchored very much more firmly, since not only is it necessary to make allowance for the weight of the additional cables themselves, it is also necessary to include the possibility of these icing up in winter. Further, such aerial cables are not totally protected against possible environmental influences and therefore have a particular maintenance involvement and need to be replaced earlier in comparison with underground cables, which can be used for many decades.

SUMMARY OF THE INVENTION

The invention is therefore based on the object of overcoming the disadvantages described above.

This object is achieved according to the invention by a method of the type cited at the outset having the features as claimed.

In this case, the method contains the following points:
the data of the secondary station are split into N data packets, N being consistent with the number of nodes,
the data packets are marked distinguishably, each marking corresponding to a particular node of the path,
each data packet is passed on along the path only to the adjoining node or the adjoining station in each case,
in each node, on receipt of a data packet, a check is performed to determine whether the marking of the packet corresponds to the respective node, and, if so, data of the node are added to the data packet,
the data packets having the data from the nodes are collected in the primary station,
and the data transmission is deemed to have been concluded successfully if all N data packets having data of all N nodes are present.

This method allows the data of all nodes, in particular of all supports in a cable car installation, to be captured and the data of the secondary station, in particular of a return station for a cable car, to be transported to the primary station, in particular a drive station for a cable car, without the need for a direct data transfer between the primary station and the secondary station. Rather, it would suffice if a support is able to set up a data connection to the respective adjoining supports or the adjoining station. It is thus possible for the method, in a preferred development, to be performed by means of a wireless data connection, in particular directional radio.

Directional radio in this case has the advantage that, if oriented appropriately, it cannot be disturbed by surrounding signals. Surrounding signals may be any signals that are emitted by radio equipment (mobile radio masts, radio transmitters, military radio, maritime radio, various directional radio, etc.). The requirement for the individual nodes in directional radio to have "visual contact" is met automatically in the case of cable cars, since in this case the individual supports are respectively connected by a cable and therefore the connection in a direct line exists automatically.

According to a quite particularly preferred embodiment of the invention, reception of the first data packet in the primary station results in a timer being started and after a defined period of time has elapsed a check is performed to determine whether all data packets have arrived. This ensures that all links in the data chain work to the full extent. This includes both data forwarding in the prescribed time and the operability of all nodes in terms of their data forwarding.

If this check is concluded negatively, that is to say that not all expected data packets have arrived after the timer has expired, an escalation, for example an alarm, is accordingly triggered in a preferred development of the invention.

This naturally does not preclude the transmitted data themselves, even if they have arrived completely and in the prescribed time, from likewise being able to be taken as a basis for triggering an alarm. In the application example of the cable car, it may be entirely possible, by way of example, for all data to have been transmitted successfully but for the data of one support to indicate that the cable is in an incorrect position, for example. In this case too, it therefore makes sense and is possibly necessary to issue a report even in the event of successful data transmission.

In a preferred embodiment of the invention, each node requires a respective period of time of x ms to process the data passed to it, and the timer is essentially consistent with the number of nodes N times the period of time. Thus, the timer is just long enough to allow reception of all data but short enough to receive new data directly. It goes without saying that the timer can also be chosen to be longer, which results in a delay sometimes needing to be incorporated if all N data packets have been issued by the secondary station, however. Since it is desirable to have information about the overall state of the installation as frequently as possible, however, such delays are useful only to a certain extent.

By contrast, it is advantageous and preferred if the individual N data packets are transferred to the first node in delayed fashion, so that said node can deal with each data packet before the node is provided with the next data packet.

In order to transport as many items of data per unit time as possible at the same time, a time value y ms, by which the data packets are staggered when issued, is essentially consistent with the period of time x ms provided for each individual node in order to receive, process and pass on a data packet.

Further preferred embodiments of the invention are the subject of the remaining subclaims.

BRIEF DESCRIPTION OF THE SEVERAL VIEWS OF THE DRAWING

A preferred exemplary embodiment of the invention is described in more detail below with reference to the drawings, in which.

DESCRIPTION OF THE INVENTION

Figure 1:
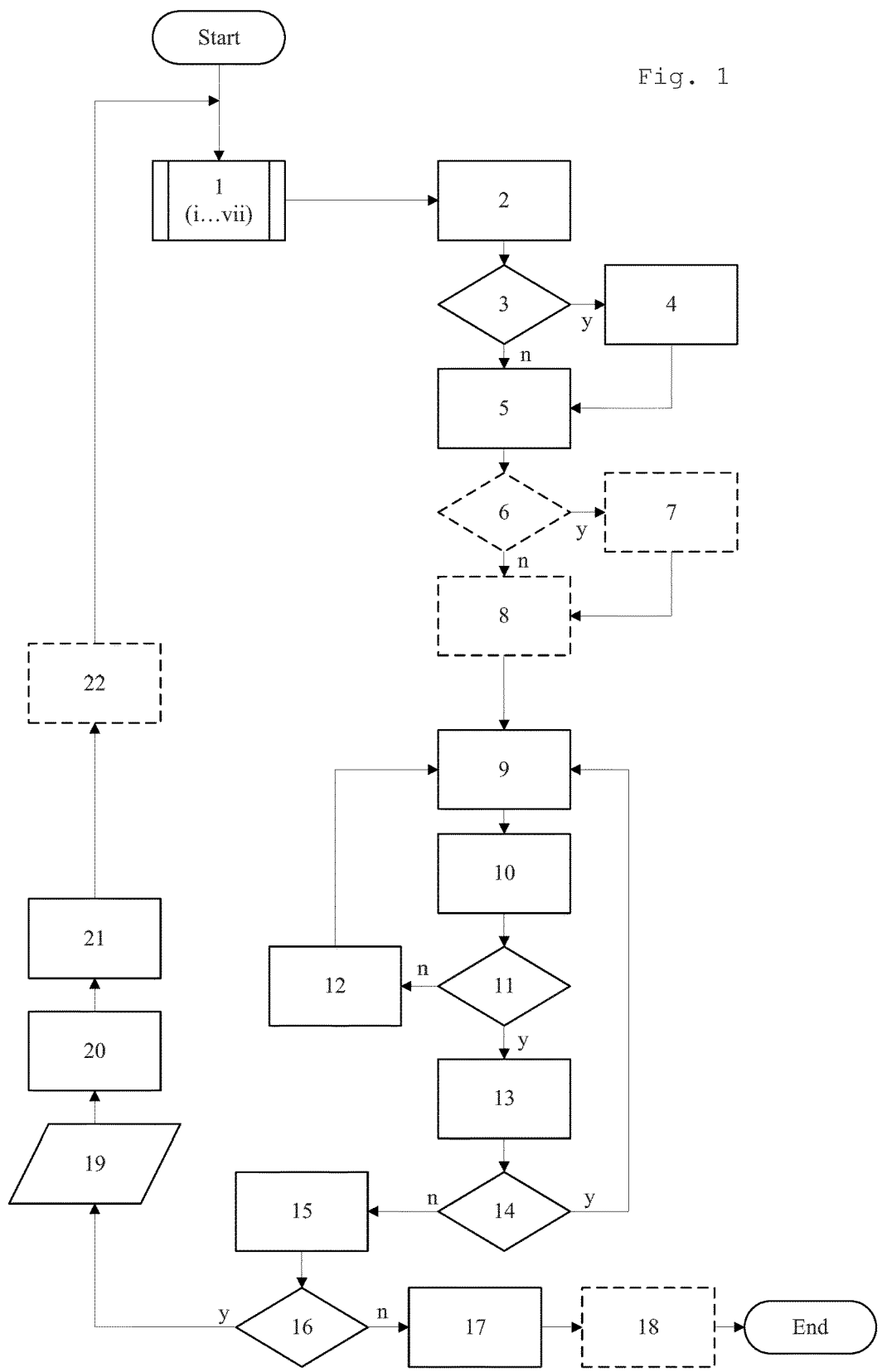
FIG. 1 shows a flowchart with an exemplary sequence for a method according to the invention.

In the flowchart of FIG. 1, data of the secondary station are first of all divided into N distinguishable, for example numbered, packets in step 1. In this case, the markings correspond to individual nodes. In the exemplary implementation depicted, the nodes and packets are simply numbered consecutively. Other markings can be chosen simply by a person skilled in the art, however. The packets are then output in staggered fashion, individually. Further details with regard to the subprocess taking place in step 1 are explained for FIG. 2.

A c-th packet from step 1 is received from the first node in step 2. This is followed by the query in step 3 to determine whether the number of the packet c is the number 1. If so, the data of the first node are added to the data packet in a step 4. This is followed by step 5, in which the data are transferred to the adjoining node. If the query in step 3 receives a negative response, step 5 follows directly and the data packet is passed on without alteration.

An m-th node then receives the data packet and checks the number of the c-th data packet in a step 6. If the number of the data packet c is consistent with the number of the node m, the data of the m-th node are added to the data packet in a step 7. The data packet is then forwarded to the next node or the next station in a step 8. If the query from step 6 receives a negative response, the data packet is forwarded without alteration.

Steps 6, 7 and 8 are repeated in this case as often as required for all nodes to have been transited and for the data packet to be forwarded to the primary station. In the case of a cable car, it would thus be possible for a total of forty nodes to be transited, for example, if the cable car has forty supports.

Once all nodes have been transited, the data packet is received in the primary station in a step 9. Once the packet has been received, an input counter r is increased by one in a step 10. This is followed in a step 11 by the query to determine whether a timer is running. If this is not running, it is started in a step 12 and the arrival of further data packets is awaited (back to step 9). If the timer is already running, there follows a step 13 in which the value t of the timer is read. If the value t of the timer is below a set end value T, the reception of further data packets is likewise awaited (back to step 9). If the end value T of the timer has already been reached or exceeded, step 15 follows.

In step 15, the value r of the input counter is read, the input counter r in this case being consistent with the number of data packets received. In step 16, a check is then performed to determine whether the number of data packets received is consistent with the number of supports, that is to say whether all data packets have arrived.

If not all data packets have been received, a report about a negative data cycle is output in step 17. Optionally, further escalation measures can be set in a step 18, such as an emergency stop for the installation, for example.

If all packets have been received, these are read, assembled and passed on to a computation unit in a step 19. In step 20, the timer is then stopped and reset to zero. In step 21, the input counter r is reset. Optionally, in a step 22, it is also possible for a report about the positive development of the data transmission to be provided.

The order of steps 19 to 22 is irrelevant to the method according to the invention in this case. As such, it is possible for the timer and the input counter to be reset simultaneously, for example, and both can be done before the data are assembled.

Analogously, it is irrelevant to the method according to the invention whether, on arrival of the first data packet in the primary station, the timer is started first or the counter is increased first. In particular because it is assumed that these steps in the primary station require only a negligible time to be performed in comparison with the transmission.

Figure 2:
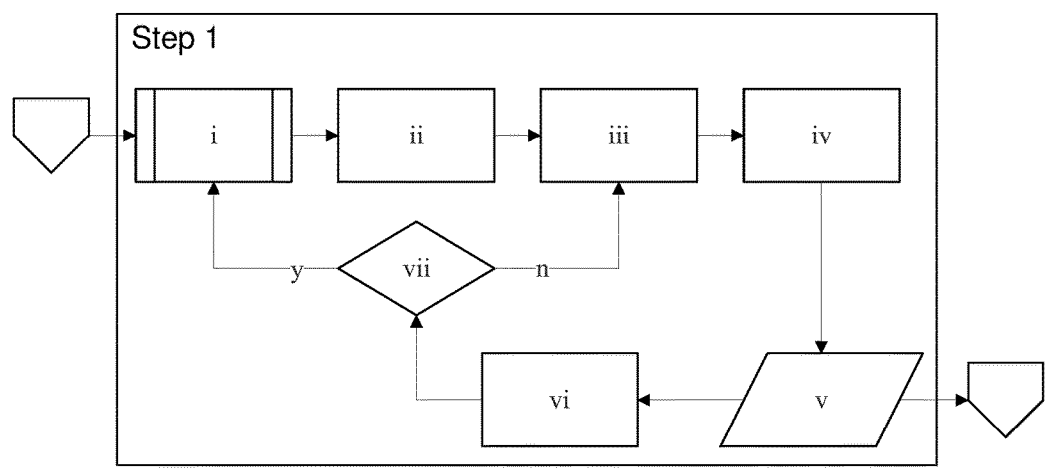
FIG. 2 shows a subprocess from FIG. 1 that describes the issue of data packets in more detail.

FIG. 2 provides a coarse outline of the subprocess from step 1 in FIG. 1. In this case, the data are first of all broken down into N distinguishable data packets in a step i. In a subsequent step ii, an output counter c is initialized that, on initialization, has the value c=0. In step iii, the counter is then increased by one so as then to be read in step iv. In step v, the c-th packet is then output to step 2 of FIG. 1.

If the markings, as in this exemplary implementation, are simple numbering of the data packets, the data can also simply just be broken down in step i and also first obtain their marking in step v. In this case, the output counter reading read in step iv can then simply be used as a marking.

Step vi symbolizes a time delay of preferably T/N that prevents the first node from being provided with more data than it can deal with. In this case, T is consistent with the total duration of the transmission and N is consistent with the number of nodes.

This is followed in step vii by the query to determine whether the output counter c has already reached the value N. If this is not the case, the counter is increased by one again in step iii and there follows the output of a further data packet. If the query from step vi leads to a positive result, the subprocess begins over and new data are broken down into N data packets in step i.

Figure 3:
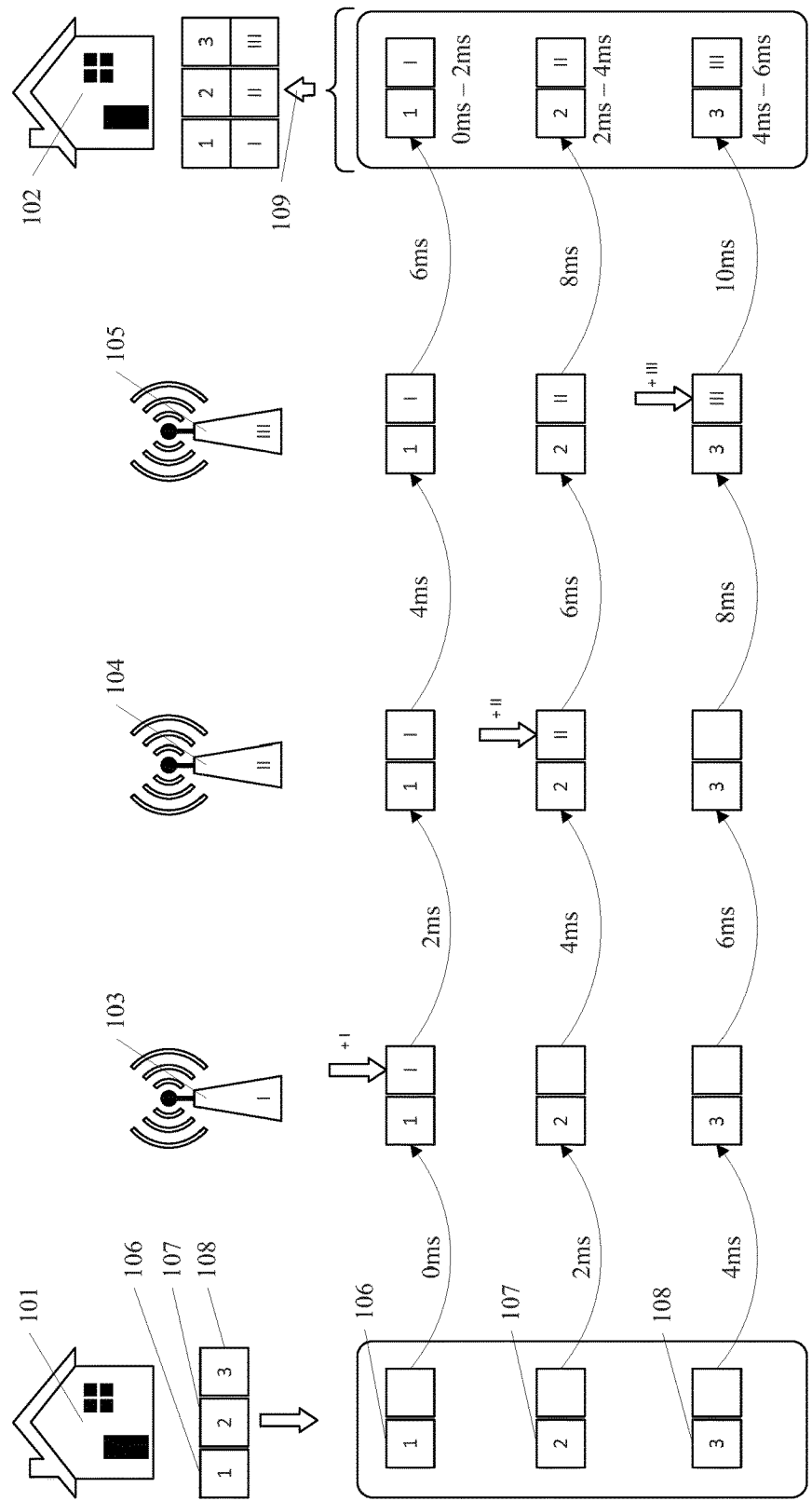
FIG. 3 shows a schematically depicted, exemplary installation for performing the method according to the invention.

The exemplary and highly schematic installation for performing the method according to the invention that is shown in FIG. 3 has a secondary station 101, a primary station 102 and three nodes 103, 104, 105.

Since the installation has three nodes 103, 104, 105, N is consistent with three (N=3) in this specific example. Consequently, the data of the secondary station are divided into three data packets 106, 107, 108. In the installation depicted, each node 103, 104, 105 requires 2 ms (T/N=2 ms→T=6 ms) for handling the data.

Accordingly, the first data packet 106 is transferred to the first node 103 at 0 ms, the second data packet 107 at 2 ms and the third data packet 108 at 4 ms. The first node 104 takes on the data packet 108, establishes that the number of the data packet matches the number of the node and adds data I to the data packet. After 2 ms, the data packet is passed on to the second node 104 and the latter forwards the data packet to the third node 105 without alteration.

After 2 ms, the second data packet 107 is passed to the first node 103 and passed on from the latter to the second node 104 after a further 2 ms. The second node 104 establishes that the number of the data packet matches the number of the node and adds data II to the data packet (etc.).

Sometimes, it may be advantageous in this case if, prior to the possibly complex determination of the marking of the data packet by the node, there is simply just a query to determine whether data of a node have already been added to the data packet. This can be effected by determining the size of the data packet, for example.

In the primary station 102, the data packets 106, 107, 108 are received and collected. In this case, there is provision for a processing time of likewise 2 ms for each data packet. After 6 ms, all data packets have arrived and can be assembled (depicted by the arrow 109).

Content of the Flow Charts:

1 Divide data of the secondary station into N distinguishable (for example numbered) packets (N=number of supports) and output
2 c-th packet from step 1 is received from the $1^{st}$ node
3 Querying of the number of the packet by first node, c=1?
   if yes: →4
   if no: →5
4 Addition of data from the $1^{st}$ node to the packet (then 5)
5 Forwarding of the packet to the next node
6 Querying of the number of the packet by m-th node, c=m?
   if yes: →7
   if no: →8
7 Addition of data from the m-th node to the packet (then 8)
8 Forwarding of the packet to the next node or the primary station
9 Reception of packet(s) in primary station
10 Increase input counter r by one
11 Timer running?
   if no: →12
   if yes: →13
12 Start timer then back to 9
13 Read value t in timer
14 Value t<T? (where T=N*x ms)//timer expired?
   if yes: back to 9 (await further packets)
   if no: →15
15 Capture value r//capture number of packets received
16 r=N?//all packets arrived?
   if no: continue at 17
   if yes: continue at 19
17 Output report about negative data cycle
18 Optionally: automatically trigger escalation//stop everything
19 Read, assemble and transfer packets to computation unit
20 Stop timer t and reset to 0
21 Reset input counter r to 0
22 Optionally: output report about positive transit, then begin over
i Break down the data into n distinguishable packets
ii Initialize output counter, output counter value c=0
iii Increase output counter by one (c+1)
iv Read value c from counter
v Output c-th packet to step 2
vi Delay of T/N
vii Output counter reading c has reached value N? (c=N?)=>
   if yes: value reached→back to i
   if no: value not reached→back to iii

The invention claimed is:

1. A method for transmitting data from at least one secondary station to at least one primary station along a segmented path, wherein two abutting segments are respectively connected by a node and wherein the path has at least three segments and at least two nodes, the method comprising:
   splitting the data of the secondary station into N data packets, where N is an integer representing a number of the nodes of the path;
   marking the data packets distinguishably, each marking corresponding to a respective node of the path;
   passing each data packet on along the path only to each respectively adjoining node or adjoining station;
   performing a check in each node, upon a receipt of a data packet, to determine whether the marking of the packet corresponds to the respective node, and, if so, adding data of the node to the data packet;
   collecting the data packets having the data from the nodes in the primary station; and
   concluding that a data transmission is successful if all N data packets having the data of all N nodes are present.

2. The method according to claim 1, which comprises starting a timer upon receiving a first data packet in the primary station and, after a defined period of time has elapsed, performing a check to determine whether all data packets have arrived.

3. The method according to claim 2, which comprises concluding that the data transmission is not successful if the check returns a negative result, and triggering an escalation.

4. The method according to claim 2, which comprises allotting a given time period x to each node to process the data and setting the defined period of time to be substantially consistent with the number of nodes N times the time period x.

5. The method according to claim 1, which comprises passing the N split data packets from the secondary station to a first node staggered by a time value y.

6. The method according to claim 5, wherein the time value y is substantially identical to the time period x.

7. The method according to claim 5, wherein the time value y is greater than or equal to the time period x.

8. The method according to claim 1, which comprises transmitting the data packets between the nodes and stations by a wireless data connection.

9. The method according to claim 8, which comprises transmitting the data packets by way of directional radio.

10. The method according to claim 1, wherein the primary station and the at least one secondary station are stations of a cableway system and the nodes are components of the cableway system selected from the group consisting of support structures, a cable, mechanical safety equipment, and electrical safety equipment.

* * * * *